United States Patent
Sawyer et al.

(10) Patent No.: US 6,825,760 B2
(45) Date of Patent: Nov. 30, 2004

(54) VEHICLE SAFETY FLAG ASSEMBLY WITH IGNITION OVERRIDE SWITCH AND METHOD OF OPERATING THE SAME

(75) Inventors: Charlie Sawyer, Orlando, FL (US); Isaac D. White, Orlando, FL (US); James E. Dickens, Ocoee, FL (US); Blake Urban, Lenoir, NC (US); Kevin Forsberg, Orlando, FL (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 63 days.

(21) Appl. No.: 10/403,774

(22) Filed: Mar. 31, 2003

(65) Prior Publication Data
US 2004/0189453 A1 Sep. 30, 2004

(51) Int. Cl.[7] .................................................. B60Q 1/26
(52) U.S. Cl. ...................... 340/463; 340/433; 307/10.3; 180/287; 116/28 R
(58) Field of Search ................................ 340/463, 433, 340/426.3, 425.5, 426.23; 307/10.3; 180/287; 116/33; 40/201

(56) References Cited

U.S. PATENT DOCUMENTS

| 2,016,971 | A | * | 10/1935 | Otis | 40/626 |
|---|---|---|---|---|---|
| 3,572,305 | A | | 3/1971 | Moragne | 123/146.5 |
| 3,805,231 | A | * | 4/1974 | Santoli | 307/10.3 |
| 4,028,827 | A | | 6/1977 | Hufton | 40/128 |
| 4,339,223 | A | | 7/1982 | Golze | 414/462 |
| 4,700,801 | A | * | 10/1987 | Ailing | 180/287 |
| 5,388,546 | A | | 2/1995 | Lombard | 116/209 |
| 5,419,065 | A | | 5/1995 | Lin | 40/550 |
| 5,609,121 | A | | 3/1997 | Gross | 116/28 |
| 5,635,902 | A | * | 6/1997 | Hochstein | 340/433 |
| 6,138,394 | A | | 10/2000 | Sulenski | 40/591 |
| 6,213,047 | B1 | * | 4/2001 | Means et al. | 116/28 R |
| 6,712,171 | B2 | * | 3/2004 | Farmer | 180/286 |

* cited by examiner

Primary Examiner—Jeffery Hofsass
Assistant Examiner—Anne V. Lai
(74) Attorney, Agent, or Firm—Myers Bigel Sibley & Sajovec

(57) ABSTRACT

Vehicle safety flag assemblies include a mounting member configured for mounting to a vehicle. A flag is movably coupled to the mounting member. The flag is movable between a first position and a second position. An ignition override switch is connected to the mounting member and/or the flag. The ignition override switch is open when the flag is in the first position to override operation of the vehicle ignition and closed when the flag is in the second position to allow operation of the vehicle. Methods of using the vehicle safety flag assemblies to safely operate a vehicle are also provided.

20 Claims, 6 Drawing Sheets

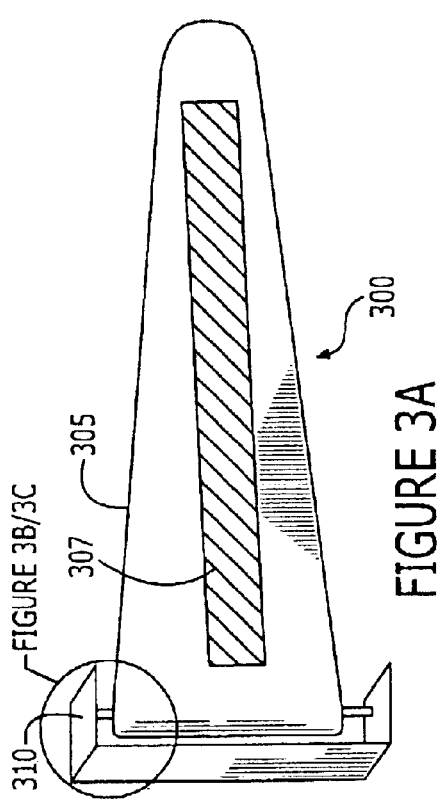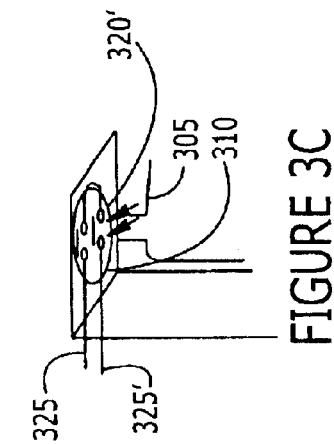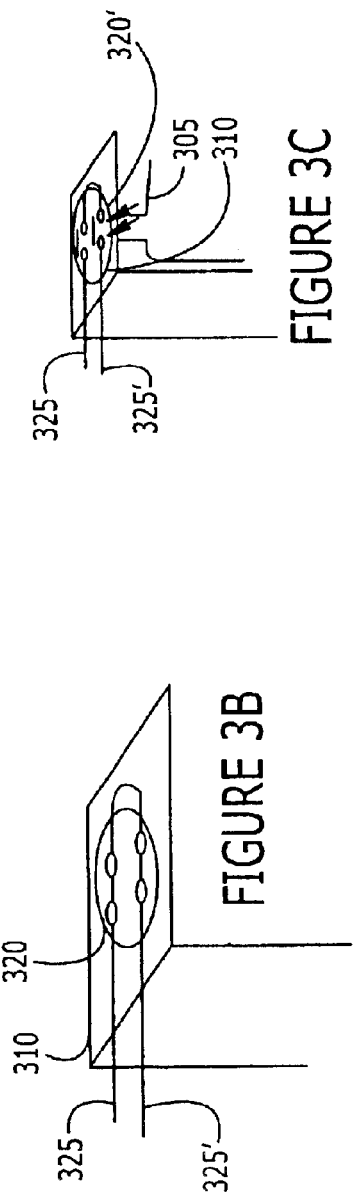

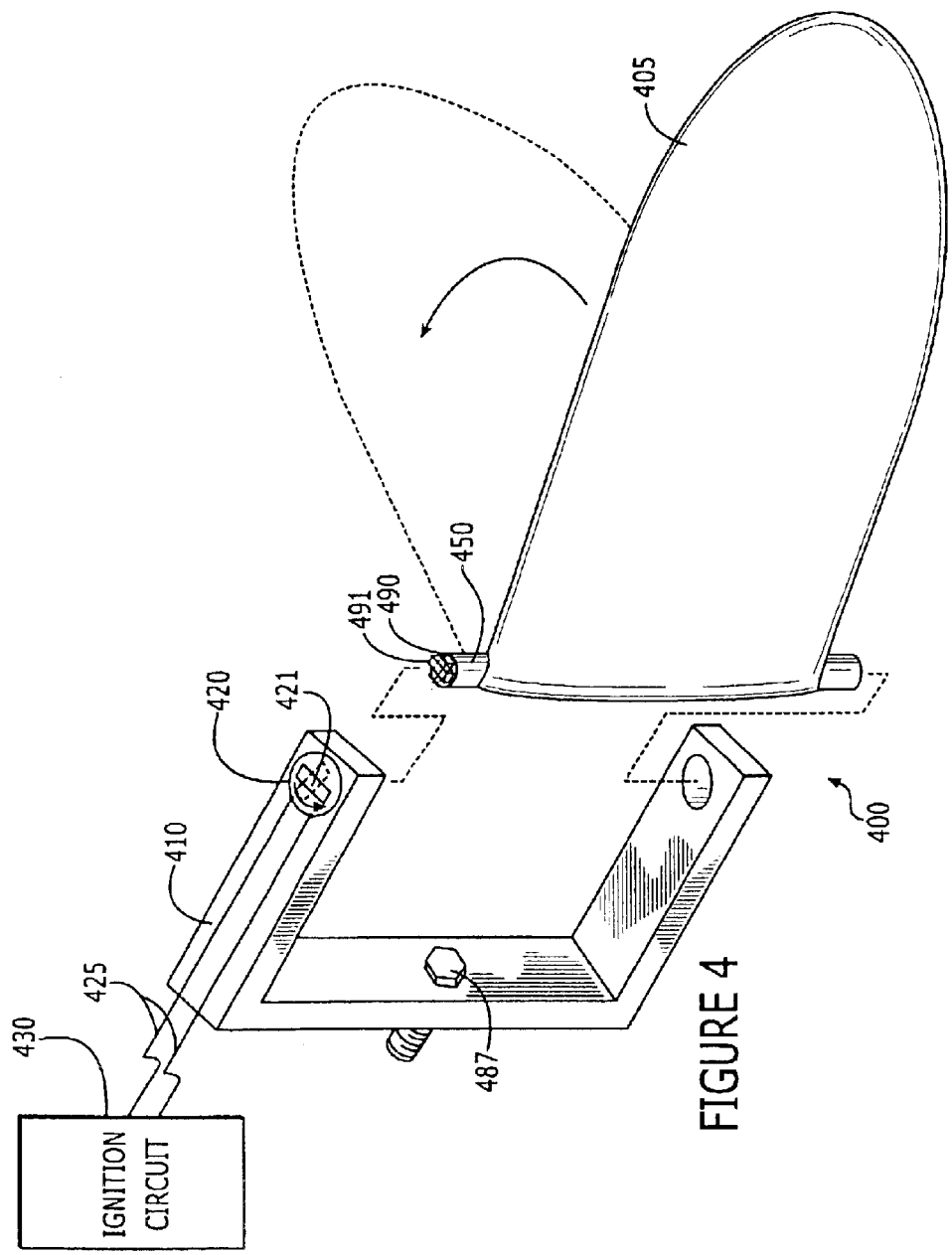

VEHICLE SAFETY FLAG ASSEMBLY WITH IGNITION OVERRIDE SWITCH AND METHOD OF OPERATING THE SAME

BACKGROUND OF THE INVENTION

The present invention relates to vehicle safety equipment and, more particularly, to vehicle safety flags suitable for use on motorized vehicles, such as utility vehicles, and methods for operating the same.

Safety devices are often used to control or to direct traffic. These safety devices, such as brightly colored (e.g., orange) cones, flags, and barrels, alert passing motorists and pedestrians to be aware of approaching conditions. These safety devices are deployed to direct traffic, for example, around an accident scene, a disabled vehicle, or a construction site. These safety devices may be deployed by utility repair crews or the like. When a telecommunications or other technician must perform a repair, the technician generally deploys the safety devices. The technician positions, for example, bright orange safety cones and/or other safety devices around the perimeter of the utility vehicle and/or of the work site. These safety devices may alert passing motorists and pedestrians to the presence of the stationary utility vehicle, and these safety devices may alert passing motorists and pedestrians to be aware when in the vicinity of the utility vehicle.

Despite the use of such safely devices, children, pets, or the like may still approach the stationary utility vehicle. As a result, a further use for such safety devices is to motivate or remind the repair technician or other vehicle operator to complete a safety walk around the stationary utility vehicle prior to starting and moving the utility vehicle.

It is known to provide various different devices for controlling operation of vehicles such as utility vehicles. For example, it is known to provide ignition override switches associated with the clutches of manual transmission vehicle, which switches may prevent starting of the vehicles without engaging the clutch. It is also known to provide ignition-override based vehicle security systems.

SUMMARY OF THE INVENTION

Embodiments of the present invention provide vehicle safety flag assemblies including a mounting member configured for mounting to a vehicle. A flag is movably coupled to the mounting member. The flag is movable between a first position and a second position. An ignition override switch is connected to the mounting member and/or the flag. The ignition override switch is open when the flag is in the first position to override operation of the vehicle ignition and closed when the flag is in the second position to allow operation of the vehicle. Methods of using the vehicle safety flag assemblies to safely operate a vehicle are also provided.

In further embodiments of the present invention, the flag is removed from at least one end of the mounting member in the second position. The ignition override switch is a spring loaded, normally closed switch connected to the mounting member. The flag includes a connecting member having an end configured to open the ignition override switch when the flag is positioned in the mounting member in the first position and to allow the switch to return to the normally closed position in the second position. In various embodiments, the flag is removed from the mounting member in the second position.

In other embodiments of the present invention, the mounting member is a substantially "C"-shaped bracket having a longitudinally extending body. A first mounting arm extends from a first end thereof and a second mounting arm extends from a second end thereof opposite the first end. The first and second mounting arms are configured to receive a connecting member of the flag. The ignition override switch is positioned on the first mounting arm so as to contact the connecting member in the first position.

In further embodiments of the present invention, the flag is a plastic reflective safety flag. The mounting member may be a magnetic mounting bracket configured for magnetic mounting to a vehicle. The mounting member may be a plastic bracket configured for attachment to a vehicle and the vehicle safety flag assembly may include an attachment member that attaches the mounting member to the vehicle. The attachment member may be a bolt and/or an adhesive.

In other embodiments of the present invention, the ignition override switch is a rotary switch positioned on an end of the mounting member. The flag is rotatably coupled to the mounting member by a rod member having an end configured to couple to the ignition override switch to open the override switch in the first position and close the override switch in the second position. The first and second positions are different rotational orientations. The first position may correspond to a high visibility position and the second position may correspond to an aerodynamic position when the mounting member is connected to a vehicle. The flag may be flush to a vehicle in the second position and extend from the vehicle in the first position when the mounting member is connected to a vehicle.

In further embodiments of the present invention, the ignition override switch is a rotary switch positioned on the flag and the flag is rotatably coupled to the mounting member. The mounting member includes a coupling member configured to couple to the ignition override switch to open the override switch in the first position and close the override switch in the second position. The first and second positions are different rotational orientations.

In other embodiments of the present invention, the ignition override switch is spring loaded and positioned on the flag. The flag is removed from at least one end of the mounting member in the second position. The mounting member includes a coupling member configured to couple to the ignition override switch to open the override switch in the first position and to allow the switch to close in the second position of the flag.

The vehicle safety flag assembly of the present invention may be used in connection with a utility vehicle. The utility vehicle may have a first of the vehicle safety flag assemblies positioned on a front end thereof and a second of the vehicle safety flag assemblies positioned on a rear end thereof.

In further embodiments of the present invention, methods are provided for safe operation of a vehicle having a vehicle safety flag assembly including an ignition override switch coupled to an ignition circuit of the vehicle and a safety flag attached to at least one of a front end or a back end of the vehicle. Operation of the vehicle is controlled responsive to the position of the safety flag by opening the ignition override switch in an open position of the safety flag to disable operation of the vehicle and closing the ignition override switch in a closed position of the safety flag to enable operation of the vehicle.

In other embodiments of the present invention, the method includes positioning the vehicle in a desired location with the safety flag in the closed position with the ignition override switch closed to allow operation of the vehicle. The safety flag is moved to the open position that opens the ignition override switch to prevent operation of the vehicle after the vehicle is positioned in the desired location. It is determined if there are any obstructions to movement of the vehicle. The safety flag is moved to the closed position if there are no obstructions to movement of the vehicle to allow operation of the vehicle. The vehicle may be restarted after moving the safely flag to the closed position.

BRIEF DESCRIPTION OF THE DRAWINGS

FIG. 3A is an exploded perspective view of a vehicle safety flag assembly according to some embodiments of the present invention;

FIG. 3B is a partial exploded perspective view of the vehicle safety flag assembly of FIG. 3A including a schematic representation of the switch circuit in a closed position according to some embodiments of the present invention;

FIG. 3C is a partial exploded perspective view of the vehicle safety flag assembly of FIG. 3A including a schematic representation of the switch circuit in an open position according to some embodiments of the present invention;

FIG. 4 is an exploded perspective view of a vehicle safety flag assembly according to some embodiments of the present invention;

DETAILED DESCRIPTION

Figure 1:
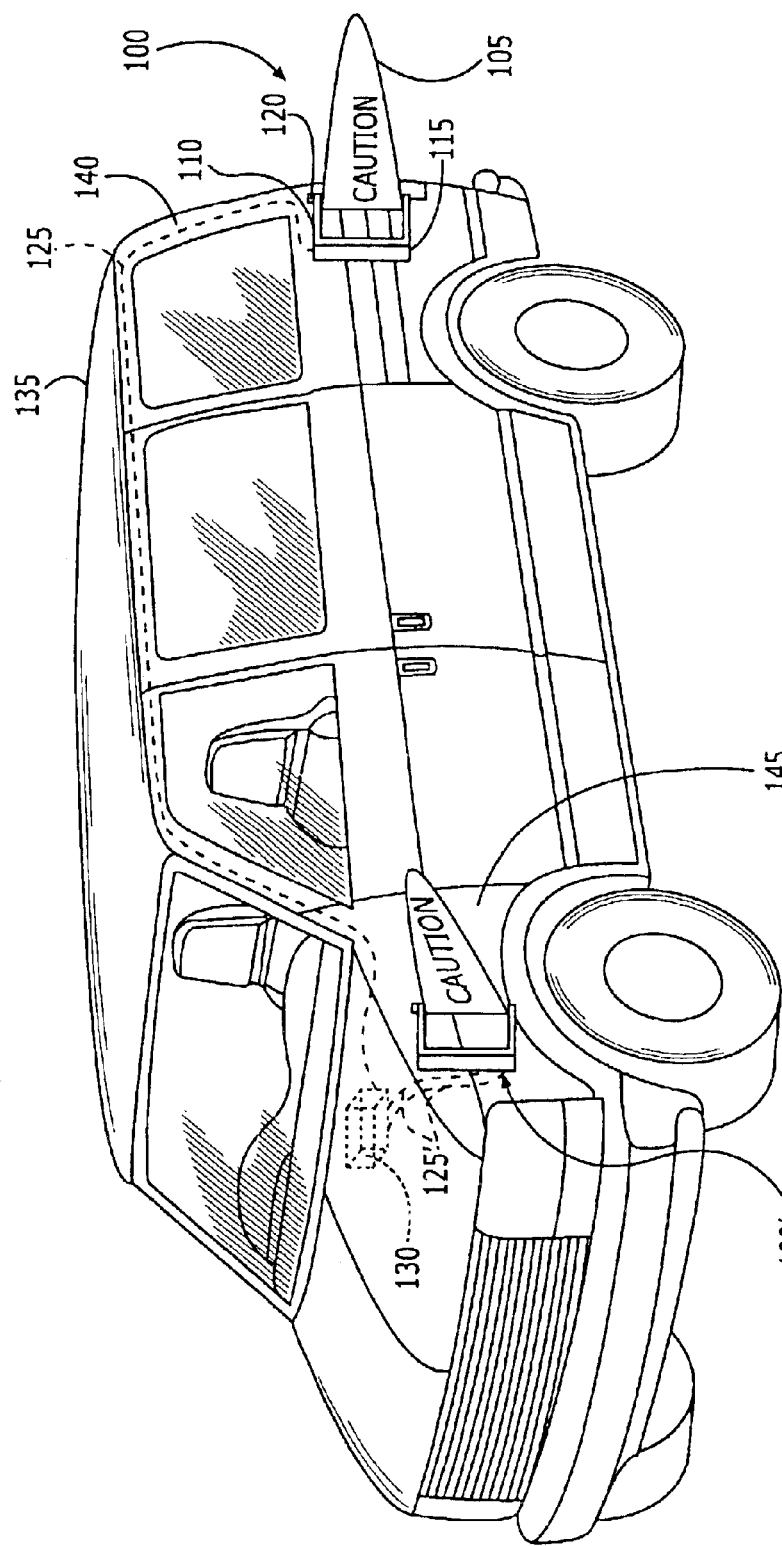
FIG. 1 is a perspective view of a vehicle safety flag assembly according to some embodiments of the present invention applied to a utility vehicle.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood that when an element is referred to as being "connected to" or "coupled to" another element, it can be directly connected or coupled to the other element or intervening elements may also be present. In contrast, when an element is referred to as being "directly connected" or "directly coupled" to another element, there are no intervening elements present.

Embodiments of the present invention will now be described with reference to the various embodiments illustrated in FIGS. 1–6. FIG. 1 illustrates vehicle safety flag assemblies 100, 100' according to some embodiments of the present invention installed on a utility vehicle. It is to be understood that vehicles, such as the utility vehicle 135 of FIG. 1, may take a variety of configurations, sizes and shapes. As noted above, such vehicles may be used in neighborhood locations where there may be a risk of children, pets or the like approaching the vehicle while the operator of the vehicle is otherwise occupied, for example, with a repair of a utility line. Such a child, pet or the like may move to a position where he or she is not readily visible to an operator returning to the driver's seat of the utility vehicle 135.

As illustrated in FIG. 1, the vehicle safety flag assembly 100 is positioned on the rear end 140 of the vehicle 135. A second vehicle safety flag assembly 100' is positioned on the front end 140 of the vehicle 135. The vehicle safety flag assembly 100 includes a flag 105 moveably coupled to a mounting member 110. As shown in the embodiments of FIG. 1, a permanent magnet 115 or other mounting means mounts the mounting member 110 to the vehicle 135. Thus, the mounting member 110 in combination with the permanent magnet 115 provide a magnetic mounting bracket configured for magnetic mounting to the vehicle 135. However, it is to be understood that the mounting member 110 need not be formed of a metal such as steel or other magnetic material and, in some embodiments of the present invention is a plastic bracket configured for attachment to the vehicle 135. Regardless of the material of the mounting member 110, a magnetic mounting means or other attachment member may be used to attach the mounting member 110 to the vehicle 135. For example, a magnet, bolt and/or an adhesive may be used alone or in combination for connecting the mounting member 110 to the vehicle 135. It is further to be understood that, while shown as separate components in FIG. 1, the mounting member 110 and flag 105 may be implement in a single unit in various embodiments of the present invention.

The flag 105 is moveable between a first and second position in relation to the mounting member 110. As will be described further herein, an ignition switch 120 is open when the flag is in an open or first position to override operation of the vehicle ignition and closed when the flag is in a second or closed position to allow operation of the vehicle 135. The first position may correspond to a high visibility position, for example, extending from the vehicle 100 as illustrated by the orientation of the flag 105 in FIG. 1. The second position may correspond to an aerodynamic position when the mounting member is connected to the vehicle 135, such as retracted or flush to the vehicle 135 as illustrated by the orientation of the flag in the vehicle safety flag assembly 100' in FIG. 1. Further examples of flags and mounting members suitable for use with embodiments of the present invention are described in U.S. patent application Ser. No. 10/330,461 filed Dec. 28, 2002 and entitled "Safety Device," which application is incorporated by reference herein in its entirety.

The vehicle safety flag assembly 100 further includes an ignition override switch 120 connected to the mounting member 110. The ignition override switch 120 is electrically connected by wires 125 to the ignition circuit 130 of the vehicle 135. The ignition override switch 120 is open when the flag 105 is in a first (such as an extended/high visibility) position to override operation of the vehicle ignition and closed when the flag 105 is in a second (such as retracted or flush to the vehicle) position to allow operation of the vehicle.

For the vehicle 135 as illustrated in FIG. 1, the vehicle safety flag assembly 100' is also electrically connected to the ignition circuit 130 by wires 125'. To provide for override of ignition operation until both flags are returned to their second position, the switches 120 of the respective vehicle safety flag assemblies 100, 100' may be connected in series in the ignition circuit 130, thereby overriding operation of the vehicle ignition if either one of the switches is open.

Figure 2:
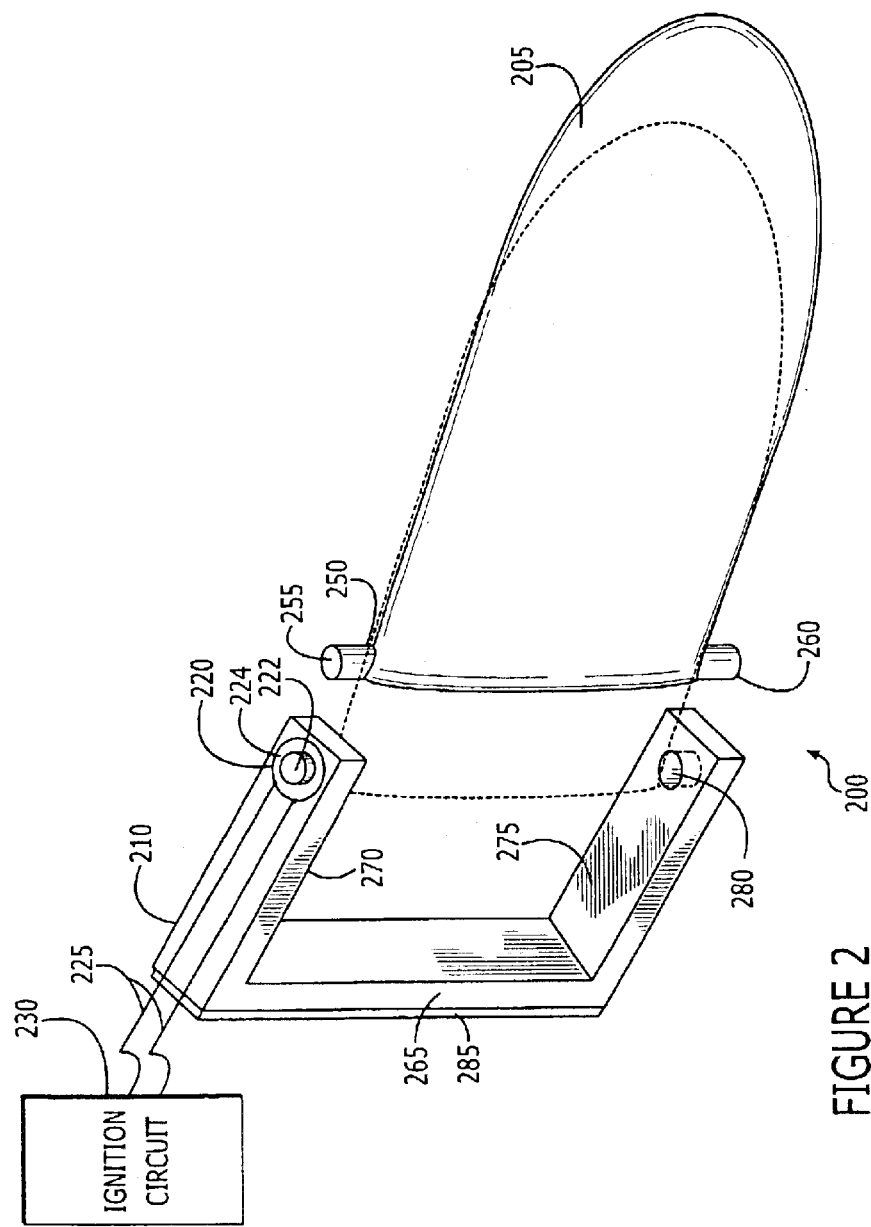
FIG. 2 is an exploded perspective view of a vehicle safety flag assembly according to some embodiments of the present invention.

Further embodiments of a vehicle safety flag assembly 200 according to the present invention will now be described with reference to the exploded perspective illustration of FIG. 2. As shown in FIG. 2, the vehicle safety flag assembly 200 includes a flag 205 and a mounting member 210. A spring loaded, normally closed switch 220 is connected to the mounting member 210. The switch 220 includes a fixed position member 224 and a moveable member 222 that is spring loaded to provide a normally closed operation connecting the incoming and outgoing wires 225 from the ignition circuit 230 when the flag 205 is removed from the mounting member 210.

The flag 205 includes a connecting member 250 having a first end 255 and a second end 260. As shown in FIG. 2, the first end 255 is configured to open the ignition override switch 220 by moving the moveable member 222 when the flag 205 is positioned in the mounting member 210 (as shown in dotted lines in FIG. 2). When the flag 205 is removed, the switch 220 is returned to the normally closed position to allow operation of the vehicle ignition. Thus, for the embodiments illustrated in FIG. 2, the first position is shown in dotted lines in FIG. 2 and corresponds to the flag 205 being connected to the mounting member and the second position is shown in solid lines in FIG. 2 and corresponds to the flag 205 being removed from the mounting member 210.

As further illustrated in the embodiments of FIG. 2, the mounting member 210 is a substantially a "C"-shaped bracket having a longitudinally extending body 265 having a first mounting arm 270 extending from a first end thereof and a second mounting arm 275 extending from a second end thereof opposite the first end. The first 270 and second 275 mounting arms are configured to receive the connecting member 250 of the flag 205. The ignition override switch 220 is positioned on the first mounting arm 270 so as to contact the connecting member 250 when the flag 205 is inserted into the mounting member 210.

As shown in FIG. 2, the second mounting arm 275 includes a cylindrical opening 280 sized to receive the end 260 of the connecting member 250. As also shown in FIG. 2, an attachment member 285 extends along a face of the body 265 opposite from the flag 205. For the embodiments illustrated in FIG. 2, the attachment member 285 is an adhesive layer, such as an adhesive strip. The adhesive strip may simply be a liquid adhesive applied to the face of the body 265 or may be a carrier strip, such as a polymer strip, with an adhesive layer on the front and back faces thereof for attachment, respectively, to the body 265 and a vehicle 135.

Embodiments of the present invention including a removable flag will now be further described with reference to FIGS. 3A–3C. As shown in FIG. 3A, the vehicle safety flag assembly 300 includes a flag 305 and a mounting member 310. For the embodiments illustrated in FIG. 3A, the flag 305 is a plastic reflective safety flag where the reflectivity is provided by a reflective strip 307. Such a reflective strip 307 may be used alone or in combination with a bright color, such as orange, for the body of the flag 305 to further increase the visibility of the flag 305.

FIG. 3B schematically illustrates a portion of the vehicle safety flag assembly 300 of FIG. 3A to illustrate the operations of the ignition override switch 320 positioned in the mounting member 310. As shown in FIG. 3B, the ignition override switch 320 is a spring loaded, normally closed switch with the line 325 entering the switch 320, passing through a first switching circuit, looping back through a second switching circuit and exiting as a line 325'. However, it is to be understood that a single switch breakpoint may be used, although use of a double switch may provide increased reliability should one of the switch circuits fail in the normally closed position.

As shown in FIG. 3C, the switch 320' is illustrated in the open position as the flag 305 has been inserted into the mounting member 310. As shown by the arrow in FIG. 3C, the displacement A of the switch contacts has opened the connection between the wire 325 and the wire 325' to provide an open circuit that may be used to prevent operation of the vehicle ignition and, thereby, prevent operation of the vehicle 135.

Further embodiments of a vehicle safety flag assembly 400 according to the present invention will now be described with reference to the exploded perspective view of FIG. 4. In FIG. 4, the flag 405 has been shown removed from the bracket 410 for purpose of illustration only. It is to be understood that, in use, the embodiments of FIG. 4 would maintain the flag 405 in the mounting member 410 in both the open and closed position of the switch 420.

As shown in the embodiments of FIG. 4, the switch 420 is a rotary switch positioned on an end of the mounting member 410 and the flag 405 is rotatably coupled to the mounting member 410 by a rod member 450. The rod member 450 has an end 490 configured to couple to the ignition override switch 420 to open the override switch in a first position, shown in solid lines in FIG. 4, and close the ignition override switch 420 in a second position shown in dotted lines in FIG. 4. The ignition override switch 420 is coupled to the ignition circuit 430 by the wires 425. As shown in FIG. 4, the end 490 comprises a keyed extending member 491 configured to mate with a corresponding receiving socket 421 in the rotary switch 420 to induce angular rotation of the rotary switch for 420 between an open position and a closed position.

The embodiments of FIG. 4 differ from those of FIG. 2 further in that a bolt 487 is provided as the attachment member. The bolt 487 passes through the connecting member 410 so as to provide a means for connecting the mounting member 410 to a vehicle 135. It will be understood that, in addition to an adhesive or a bolt 487, other attachment means suitable for use with the present invention include screws, rivets, clamps or the like configured for the attachment of the mounting member 210, 310, 410, 510 to the vehicle 135.

Figure 5:
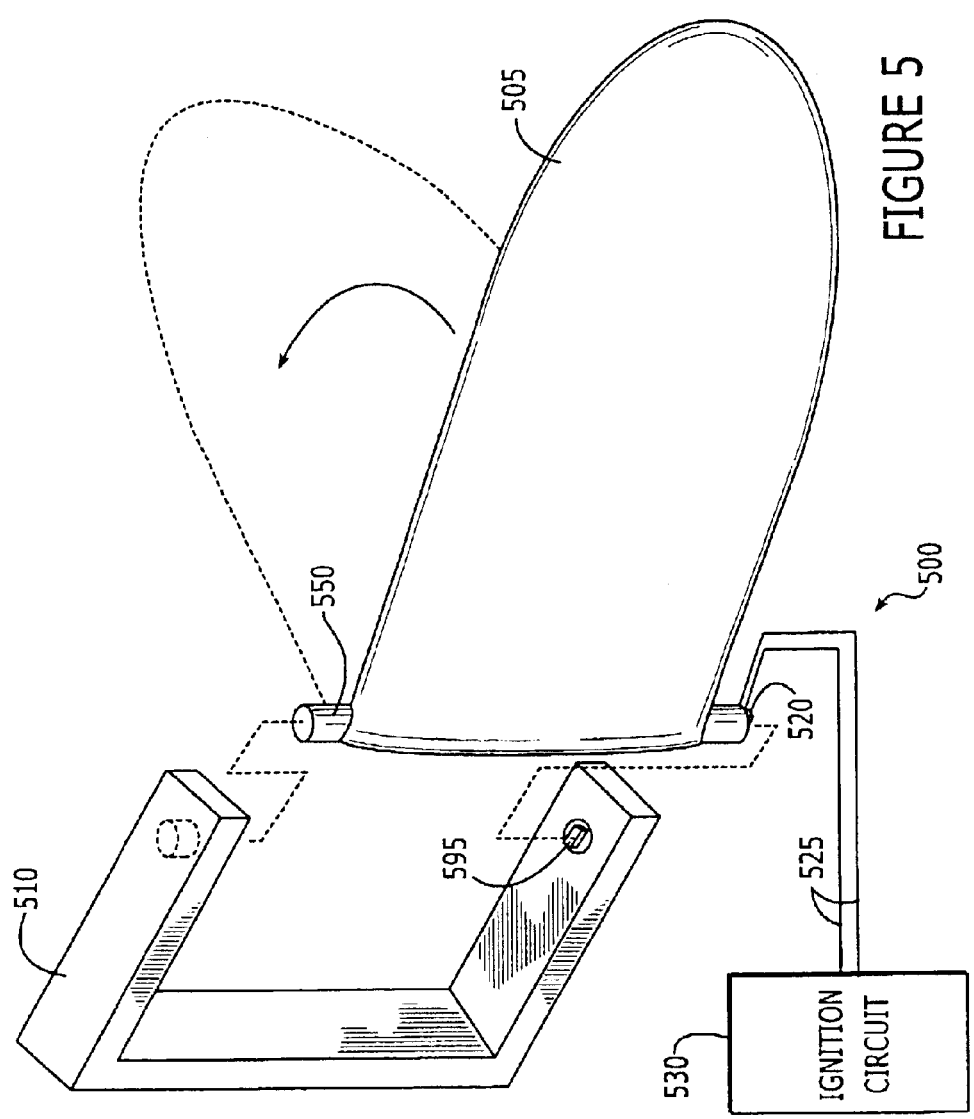
FIG. 5 is an exploded perspective view of a vehicle safety flag assembly according to some embodiments of the present invention.

Further embodiments of the present invention will now be described with reference to the exploded perspective illustration of FIG. 5. As shown in FIG. 5, the vehicle safety flag assembly 500 includes a flag 505 and a mounting member 510. For the embodiments illustrated in FIG. 5, the ignition override switch 520 is positioned on the flag 505 (more particularly on the rod 550). Although the switch 520 will be described generally as a rotary switch, it is to be understood that the switch 520 in other embodiments of the present invention where the switch is mounted on the flag 505 may be a spring loaded or other type switch.

Although the flag 505 is illustrated in exploded perspective view for ease of understanding the present invention, it will be understood that, in use, the flag 505 is rotatably coupled to the mounting member 510. The mounting member 510 includes a coupling 595, shown in FIG. 5 as a rectangular key extending up from the mounting member 510 toward the switch 520, that is configured to couple to the ignition override switch 520 so as to open the override switch 520 in the first position illustrated in solid lines in FIG. 5 and close the override switch 520 in the second position illustrated in dotted line in FIG. 5. The switch 520 is coupled to the ignition circuit 530 by wires 525.

While the respective open and closed positioned have been described with reference to FIGS. 1–5 above in relation to particular orientations being closed and alternate orientations being open, it is to be understood that other embodiments fall within the scope of the present invention. Thus, positions described above as open position may, in other embodiments of the present invention, be the closed position and vice versa.

Figure 6:
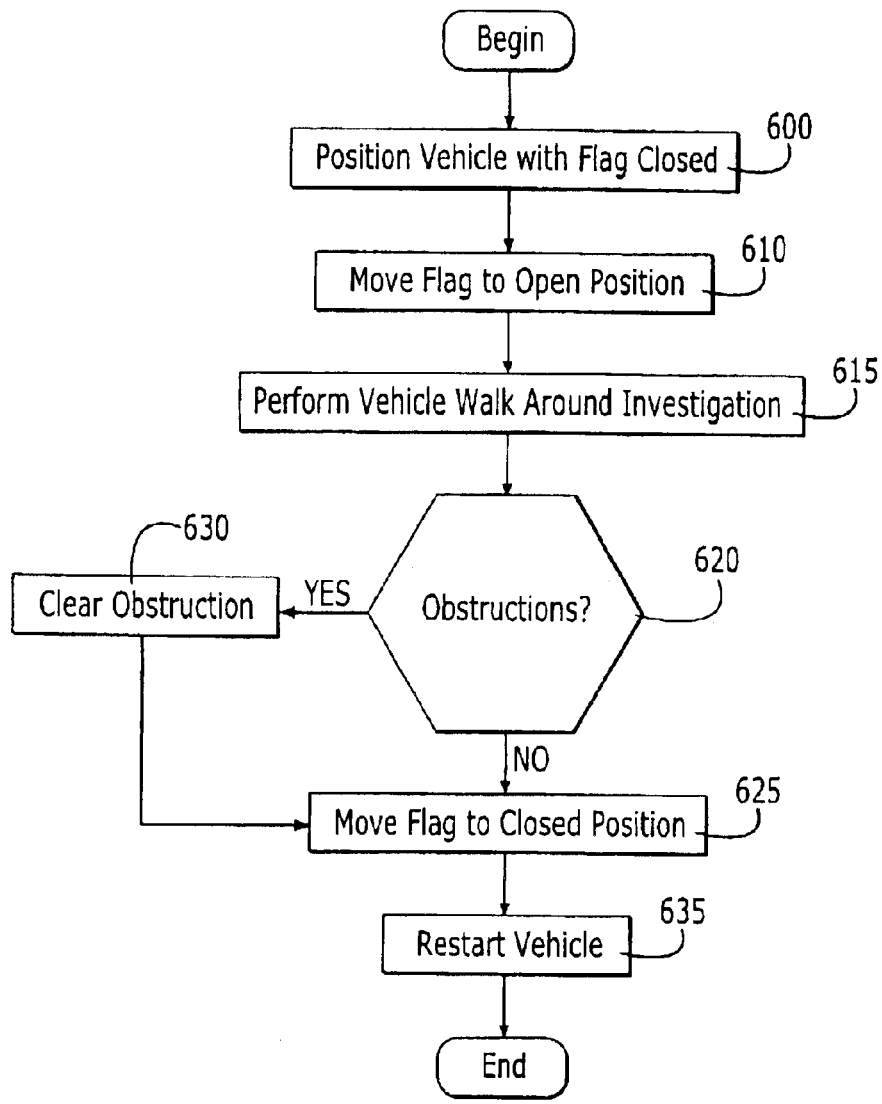
FIG. 6 is a flow chart illustrating methods for safe operation of a vehicle according to some embodiments of the present invention.

The flowchart of FIG. 6 illustrates the architecture, functionality, and operation of possible implementations of methods for safe operation of vehicles according to some embodiments of the present invention. It should be noted that, in some alternative implementations, the acts noted in the blocks may occur out of the order noted in the figures. For example, two blocks shown in succession may, in fact, be executed substantially concurrently, or the blocks may be executed in the reverse order, depending upon the functionality involved.

As shown in the embodiments of FIG. 6, operations for safe operation of a vehicle begin at Block 610 when a vehicle including a safety flag assembly having an ignition override switch coupled to an ignition circuit of the vehicle and a safety flag attached to at least one of the front or back end of the vehicle is positioned at a desired location. The safety flag is in the closed position with the ignition override switch closed to allow operation of the vehicle to position the vehicle in the desired location. The safety flag is moved to the open position to open the ignition override and prevent operation of the vehicle after the vehicle is positioned in the desired location as illustrated at Block 610. The operator of the vehicle may then complete the task at the desired location, such as repairing a power line. It is then determined, for example by an operator of the vehicle, if there are any obstructions to movement of the vehicle at Block 615. If there are no obstructions to movement of the vehicle (Block 620) the safety flag is moved to the closed position to allow operation of the vehicle at Block 625. If there are obstructions observed, the obstructions may be cleared at Block 630 before moving the safety flag to the closed position at Block 625. After the safety flag is moved to the closed position, operation of the vehicle may be commenced by restarting the vehicle at Block 635.

While particular operations have been described for safe operation of a vehicle with reference to FIG. 6 it is to be understood that other embodiments of the present invention may be used including controlling operation of the vehicle responsive to the position of the safety flag by the opening the ignition override switch in an open position of the safety flag to disable operation of the vehicle and closing the ignition override switch in a closed position of the safety flag to enable operation of the vehicle. Such other embodiments are to be understood as encompassed within the scope of the present invention. Thus, the assembly apparatus and operation methods of the present invention may provide for improved safety in use of vehicles, such as utility vehicles, by preventing starting of the vehicle and movement thereof when a safety flag is deployed so as to motivate or remind the vehicle operator to do a safety walk around the vehicle prior to moving the vehicle.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A vehicle safety flag assembly comprising:
   a mounting member configured for mounting to a vehicle;
   a flag movably coupled to the mounting member, the flag being movable between a first position and a second position; and
   an ignition override switch connected to at least one of the mounting member or the flag, the ignition override switch being open when the flag is in the first position to override operation of the vehicle ignition and closed when the flag is in the second position.

2. The vehicle safety flag assembly of claim 1 wherein the flag is removed from at least one end of the mounting member in the second position and wherein the ignition override switch is a spring loaded, normally closed switch connected to the mounting member and wherein the flag includes a connecting member having an end configured to open the ignition override switch when the flag is positioned in the mounting member in the first position and to allow the switch to return to the normally closed position in the second position.

3. The vehicle safety flag assembly of claim 2 wherein the flag is removed from the mounting member in the second position.

4. The vehicle safety flag assembly of claim 2 wherein the mounting member comprises a substantially "C" shaped bracket having a longitudinally extending body having a first and second mounting arms extending therefrom, the first and second mounting arms being configured to receive a connecting member of the flag, and wherein the ignition override switch is positioned on the first mounting arm so as to contact the connecting member in the first position.

5. The vehicle safety flag assembly of claim 4 wherein the flag comprises a plastic reflective safety flag.

6. The vehicle safety flag assembly of claim 4 wherein the mounting member comprises a magnetic mounting bracket configured for magnetic mounting to a vehicle.

7. The vehicle safety flag assembly of claim 4 wherein the mounting member comprises a plastic bracket configured for attachment to a vehicle and wherein the vehicle safety flag assembly further comprises an attachment member that attaches the mounting member to the vehicle.

8. The vehicle safety flag assembly of claim 7 wherein the attachment member comprises at least one of a bolt or an adhesive.

9. A utility vehicle including a first of the vehicle safety flag assemblies of claim 4 positioned on a front end thereof and a second of the vehicle safety flag assemblies of claim 4 positioned on a rear end thereof.

10. The vehicle safety flag assembly of claim 1 wherein the ignition override switch comprises a rotary switch positioned on an end of the mounting member and wherein the flag is rotatably coupled to the mounting member by a rod member having an end configured to couple to the ignition override switch to open the override switch in the first position and close the override switch in the second position, the first and second positions being different rotationally oriented positions.

11. The vehicle safety flag assembly of claim 10 wherein the first position corresponds to a high visibility position and wherein the second position corresponds to an aerodynamic position when the mounting member is connected to a vehicle.

12. The vehicle safety flag assembly of claim 11 wherein the aerodynamic position is flush to a vehicle and the high visibility position is extended from the vehicle when the mounting member is connected to a vehicle.

13. The vehicle safety flag assembly of claim 10 wherein the mounting member comprises a substantially "C" shaped bracket having a longitudinally extending body having a first and second mounting arms extending therefrom, the first and second mounting arms being configured to rotatably receive respective ends of a connecting member of the flag extending therebetween and wherein the ignition override switch is positioned on the first mounting arm and connected to an end of the connecting member received therein.

14. A utility vehicle having a first of the vehicle safety flag assemblies of claim 13 positioned on a front end thereof and a second of the vehicle safety flag assemblies of claim 13 positioned on a rear end thereof.

15. The vehicle safety flag assembly of claim 1 wherein the ignition override switch comprises a rotary switch positioned on the flag and wherein the flag is rotatably coupled to the mounting member and wherein the mounting member includes a coupling member configured to couple to the ignition override switch to open the override switch in the first position and close the override switch in the second position, the first and second positions being different rotational orientations of the flag.

16. The vehicle safety flag assembly of claim 1 wherein the ignition override switch is spring loaded and positioned on the flag and wherein the flag is removed from at least one end of the mounting member in the second position and wherein the mounting member includes a coupling member configured to couple to the ignition override switch to open the override switch in the first position and to allow the switch to close in the second position of the flag.

17. A utility vehicle having a first of the vehicle safety flag assemblies of claim positioned on a front end thereof and a second of the vehicle safety flag assemblies of claim 1 positioned on a rear end thereof.

18. A method for providing safe operation of a vehicle having a vehicle safety nag assembly including an ignition override switch coupled to an ignition circuit of the vehicle and a safety flag attached to at least one of a front end or a back end of the vehicle, the method comprising:

controlling operation of the vehicle responsive to the position of the safety flag by opening the ignition override switch in an open position of the safety flag to disable operation of the vehicle and closing the ignition override switch in a closed position of the safety flag to enable operation of the vehicle.

19. A method of claim 18 wherein controlling operation of the vehicle comprises:

positioning the vehicle in a desired location with the safety flag in the closed position with the ignition override switch closed to allow operation of the vehicle;

moving the safety flag to the open position that opens the ignition override switch to prevent operation of the vehicle after the vehicle is positioned in the desired location;

determining if there are any obstructions to movement of the vehicle; and moving the safety flag to the closed position if there are no obstructions to movement of the vehicle to allow operation of the vehicle.

20. The method of claim 19 wherein controlling operation of the vehicle further comprises restarting the vehicle after moving the safety flag to the closed position.

* * * * *